(12) United States Patent
Gee

(10) Patent No.: US 6,254,196 B1
(45) Date of Patent: Jul. 3, 2001

(54) AXLE HUB ASSEMBLY WITH REMOVABLE AXLE SHAFT

(76) Inventor: Thomas A Gee, 7714 Park Ave., Allen Park, MI (US) 48101

( * ) Notice: Subject to any disclaimer, the term of this patent is extended or adjusted under 35 U.S.C. 154(b) by 0 days.

(21) Appl. No.: 09/469,182

(22) Filed: Dec. 21, 1999

(51) Int. Cl.$^7$ .................................................. B60B 35/16
(52) U.S. Cl. ................................ 301/124.1; 301/105.1; 301/137
(58) Field of Search ....................... 301/105.1, 124.1, 301/126, 130, 131, 137

(56) References Cited

U.S. PATENT DOCUMENTS

| | | | |
|---|---|---|---|
| 583,195 | * | 5/1897 | Ferguson ............................. 301/126 |
| 900,562 | * | 10/1908 | Martin ................................. 301/131 |
| 1,594,148 | | 7/1926 | Buckwalter . |
| 1,819,110 | | 8/1931 | Moorhouse . |
| 3,099,491 | | 7/1963 | Peras . |
| 4,121,871 | * | 10/1978 | Adams, Jr. ......................... 301/105.1 |
| 4,331,210 | | 5/1982 | Petrak . |
| 4,371,214 | | 2/1983 | Strader . |
| 4,381,874 | | 5/1983 | Strader . |
| 4,437,536 | | 3/1984 | Colanzi et al. . |
| 4,765,688 | | 8/1988 | Hofmann et al. . |
| 4,881,842 | | 11/1989 | Farrell et al. . |
| 4,986,608 | * | 1/1991 | Fett .................................... 301/124.1 |
| 5,281,005 | * | 1/1994 | Babcock et al. ............... 301/124.1 X |
| 5,458,352 | | 10/1995 | Lederman . |
| 5,553,927 | | 9/1996 | Mastrangelo . |
| 5,603,554 | | 2/1997 | Monroe et al. . |
| 5,720,530 | | 2/1998 | Holsnijders et al. . |
| 5,782,566 | | 7/1998 | Bertetti . |
| 6,017,097 | * | 1/2000 | Weir, III ........................... 301/137 X |

\* cited by examiner

Primary Examiner—Russell D. Stormer
(74) Attorney, Agent, or Firm—Liniak, Berenato, Longacre & White

(57) ABSTRACT

A full floating inverted axle assembly having a removable axle shaft. A hub assembly includes an inner race rigidly connected to a wheel body and rotatably connected to an outer race which is in turn rigidly connected to an axle housing to enable rotation of the wheel body relative to the axle housing. A driving member is disposed within the axle housing for driving the inner race and wheel body. A removable axle shaft forms a detachable connection between the driving shaft and inner race. The removable axle shaft is externally removable from the entire axle assembly when the hub assembly is connected to the axle housing. Such an arrangement facilitates a disconnect between the driving member and inner race thereby allowing the wheel body to freely rotate, such as during towing, without having to remove the hub assembly. A brake torque member may be disposed between the inner race and axle housing to allow customized brake arrangements.

12 Claims, 2 Drawing Sheets

AXLE HUB ASSEMBLY WITH REMOVABLE AXLE SHAFT

BACKGROUND OF THE INVENTION

1. Field of the Invention

The present invention is directed to a driving axle assembly and is more particularly directed to a full floating inverted axle hub assembly with a removable axle shaft.

2. Description of the Related Art

In conventional rear axle assemblies the wheel hub is secured to the axle by a nut on the end of the axle. All axial forces on the wheel hub are directly transmitted to the axle. Furthermore, the weight of the vehicle is transmitted to the wheel hub and consequently to the axle causing a bending moment on the axle. The axle shaft, which turns on a bearing in the axle tube/housing, must then be strong and heavy to endure all these loads. This arrangement is undesirable particularly in heavy-duty truck applications.

In an effort to remove loads applied to the axle shafts, full floating axle assemblies were designed. Full floating axle hub assemblies provide hubs mounted on bearings directly attached to the axle housing independently of the axle shaft that drives the hub. With this arrangement the axle shaft only provides torque to drive the hub and consequently turn the wheels and does not endure vehicle weight or axial loads. However, heretofore, the prior art has failed to provide a full floating inverted axle hub assembly having an independently removable axle shaft or a replaceable brake torque plate.

SUMMARY OF THE INVENTION

It is an object of the present invention to provide an improved axle hub assembly that improves upon the related art.

The present invention is directed to full floating inverted axle hub assembly. An inverted hub assembly is an arrangement providing an inner race disposed within the outer race. The inverted hub assembly includes an inner race rigidly connected to a wheel body and rotatably connected to an outer race which is in turn rigidly connected to an axle housing to enable rotation of the wheel body relative to the axle housing without substantial relative motion in the other five degrees of freedom. A driving member is disposed within the axle housing for driving the inner race and wheel body. A removable axle shaft forms a detachable connection between the driving member and inner race. The removable axle shaft is externally removable from the entire axle assembly when the hub assembly is connected to the axle housing. Such an arrangement facilitates a disconnect between the driving member and inner race thereby allowing the wheel body to freely rotate, such as during towing, without having to remove the hub assembly. The full floating arrangement alleviates excessive loads placed on the driving member.

DESCRIPTION OF THE PREFERRED EMBODIMENT

Figure 1:
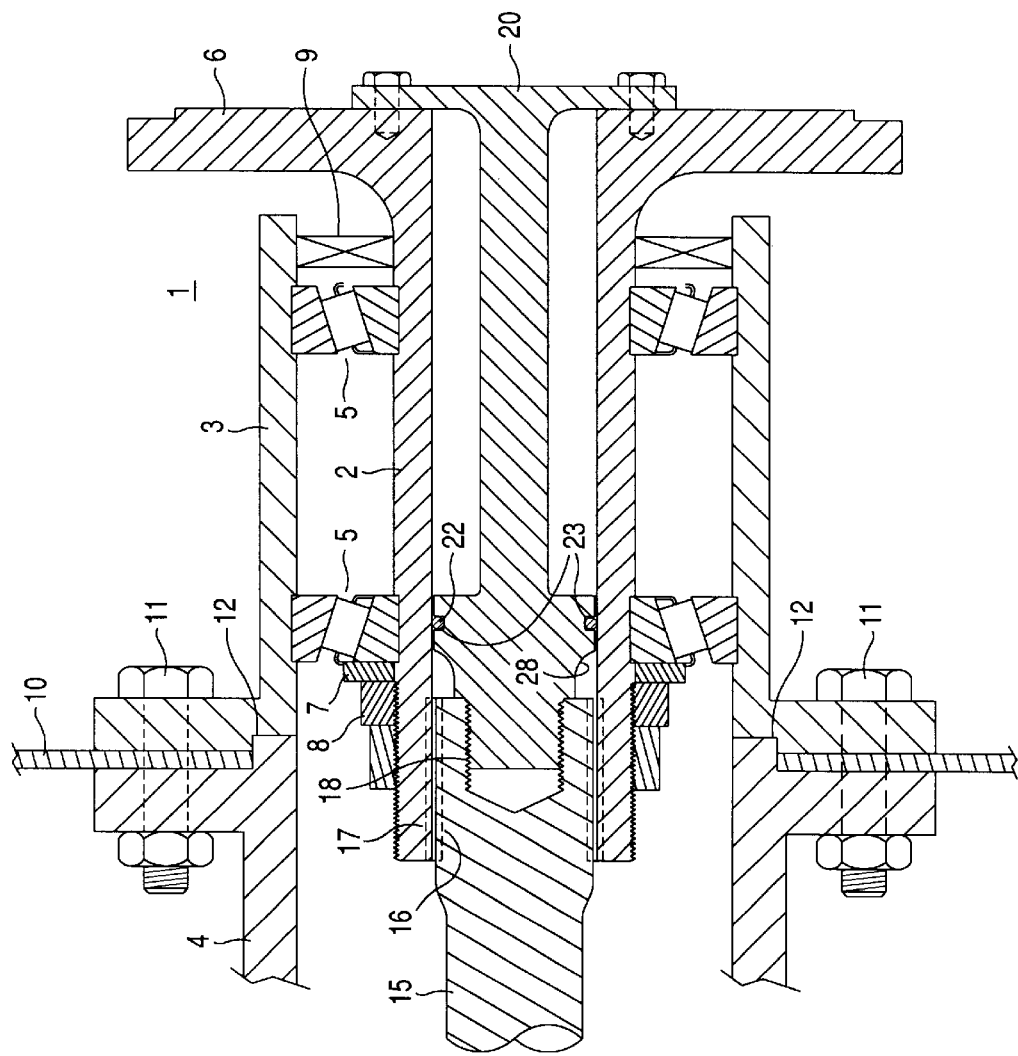
FIG. 1 fragmentary sectional view of the full floating inverted axle hub assembly according to the present invention.

FIG. 1 is a sectional view of the preferred embodiment of the present invention. A hub assembly 1 includes an inner race 2 formed of a hollow substantially cylindrical member rotatably secured to an outer race 3 which is in turn rigidly secured to an axle housing 4. Two tapered roller bearings 5 are disposed between the inner race 2 and the outer race 3 as may be conventionally found within the art. In the embodiment of FIG. 1, a pair of spaced apart tapered roller bearing assemblies are seated in seats formed in the radially inner surface of the outer race 3 and the outer peripheral surface of the inner race 2. A washer 7 and threaded lock nut 8 may be employed to axially retain the bearing assemblies. The threaded lock nut 8 is simply threaded onto the end of the inner race 2 opposite the flange portion 6. The hub assembly 1, with the assembled inner race 2 outer race 3 and bearings 5 are then bolted to the axle housing 2 to form a rotatable connection between the inner race 2, and flange portion 6, with respect to the axle housing 4. The flange portion 6 is adapted to be connected to a wheel body 19 (schematically represented in FIGS. 2A & 2B) thereby establishing a rotatable connection between the wheel body 19 and the axle housing 2. The flange portion 6 is adapted to be connected to a wheel body as is conventionally known in the art. The wheel body may include a brake drum or brake rotor. Preferably the inner race 2 and the flange portion 6 are integrally formed of a single piece of metal. However, the flange portion 6 and the inner race 2 may be made of two different steel alloys welded to one another to form an integral body. A seal (generically represented as 9 in FIG. 1) is disposed between the inner race 2 and outer race 3 adjacent an external end to contain lubricating fluid within the axle assembly.

In order to accommodate different types of brake arrangements, a brake torque member 10 is disposed between the outer race 3 and the axle housing 2. The brake torque member may be formed of different sizes and shapes to accommodate different axle/wheel end designs. As can be seen in FIG. 1, the brake torque member 10 is sandwiched between the axle housing 2 and outer race 3 of the hub assembly. The brake torque member 10 is simply placed against and aligned with the corresponding surface of the axle housing 2. The outer race 3 together with the remaining portions of the hub assembly 1 are then aligned with the axle housing 4 and brake torque member 10 and simply bolted in place via bolts 11 extending through bores formed through the outer race 3, brake torque member 10 and axle housing 2. Preferably, the axle housing 4 and the outer race 3 of the hub assembly 1 have a shoulder/notch interface 12 (conventionally known in the art as a pilot or spigot attachment) to facilitate easy alignment and installation. It is noted that the outer race 3 of the hub assembly can be directly secured to the axle housing 4 in embodiments not contemplating a brake torque member 10 as arranged in the presently described embodiment. In either embodiment, a gasket or other seal is disposed between the axle housing 4 and the outer race 3 to seal lubricating fluid within the axle assembly.

The axle housing 4 houses a driving member 14 associated with a differential assembly or other gear arrangement as is conventionally found in the art. In the present invention, like in other axle shaft arrangements, the suspension system is directly secured to the axle housing 4 and is not directly connected to the inner race 2 of the hub assembly 1 nor the wheel body 19. Consequently, the driving member 14 does not bear any of the dead weight or dynamic loads of the vehicle. Furthermore, the driving member 14 (schematically shown in FIGS. 2A & 2B) is not directly connected to the inner race 2 of the hub assembly 1. Rather, the present invention includes a removable axle shaft 15 that is detachably connected to the driving member 14 and the inner race 2. In the driving mode, the removable axle 15 is splined into the driving member 14 or otherwise connected thereto to form a connection there between to allow torque transfer from the driving member 14 to the removable axle 15. The removable axle 15 is in turn removably connected to the inner race 2. Preferably, the removable axle is splined to the inner race. The removable axle 15 has external splines formed on an end opposite the connection with the driving member 14. The removable axle 15 is disposed within the hollow substantially cylindrical member forming the inner race 2. The external splines 16 of the removable axle engage splines 17 formed on an inner surface 18 of the inner race 2. The removable axle 15 has dimensions to allow the removable axle 15 to translate through the inner race 2 to facilitate removal therefrom. The removable axle 15 simply has an outer diameter less than or equal to a corresponding inner diameter of the inner race 2. More specifically, the splines formed on the differential end of the axle shaft 15 are capable of sliding through the splines of the inner race 2. Such an arrangement allows the removable axle 15 to be disconnected from the driving member 14 and removed from the axle hub assembly while the hub assembly is connected to the axle housing 4. This provides the ability to selectively choose the driving state of the wheel body. When free running of the wheel body 19 is desired, such as during vehicle towing, the removable axle 15 is simply removed from the assembly. When positive driving of the wheel body 19 is desired, the removable axle shaft 15 is simply inserted in the inner race 2 of the hub assembly 1 to engage the driving member 14.

To facilitate installation and removal of the removable axle shaft 15, a retainer 20 is provided. The retainer 20 is simply a bolt, or other member, extending through the inner race 2 from the wheel body end adjacent the flange portion 6 to the removable axle 15. The retainer 20 is simply threaded 18 to the removable axle 15. The retainer 20 has a widened area adjacent the flange portion 6 and is simply secured thereto such as by bolts as shown in FIG. 1. The retainer 20 is loosely threaded 18 to the driving member 14 to allow some free play rotation of the retainer 20 for alignment with the flange portion 6 of the inner race. However, the retainer 20 may be connected to the flange portion 6 of the inner race 2 in any other suitable fashion. The retainer 20 has a plug portion 28 formed within the inner race 2. An annular seal 22 is disposed within an annular recess 23 formed in the plug portion 28 to form a seal between the plug portion 28 of the retainer 20 and the inner peripheral surface of the inner race 2. Such an arrangement is particularly useful in arrangements contemplating a central tire inflation system. However, a more simple arrangement may be employed for the retainer 20 wherein the retainer simply has an extension to engage the removable shaft 15 to prevent axial displacement. The inner race 2 may be sealed from the external environment by placing a gasket or other seal between the retainer 20 and the flange portion 6 of the inner race 2.

The retainer 20 primarily serves to hold the removable axle shaft 15 within the inner race 2 preventing axial translation. However, as previously mentioned, the retainer 20, also serves to seal the lubricating fluid within the axle hub assembly.

Figure 2A:
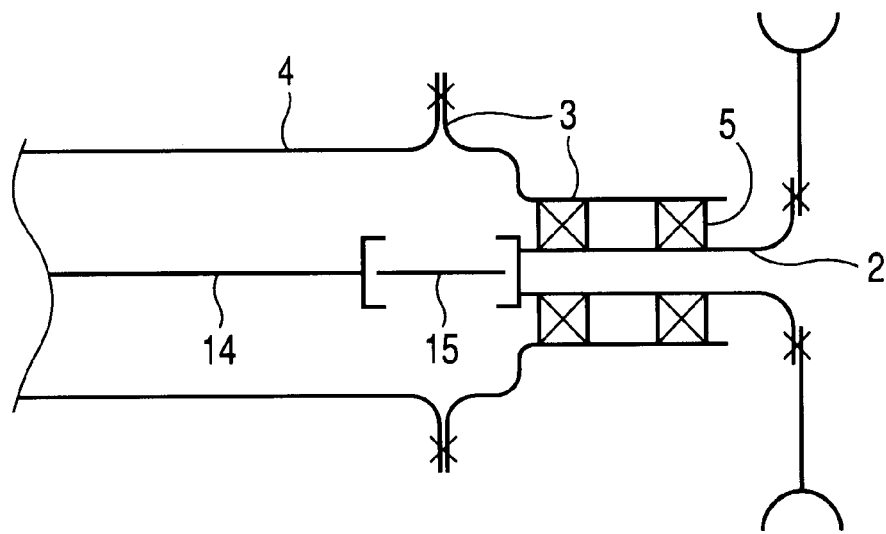
FIGS. 2A & 2B are schematic representations of the axle hub assembly of FIG. 1 with the removable axle in an assembled and a removed position respectively.
Figure 2B:
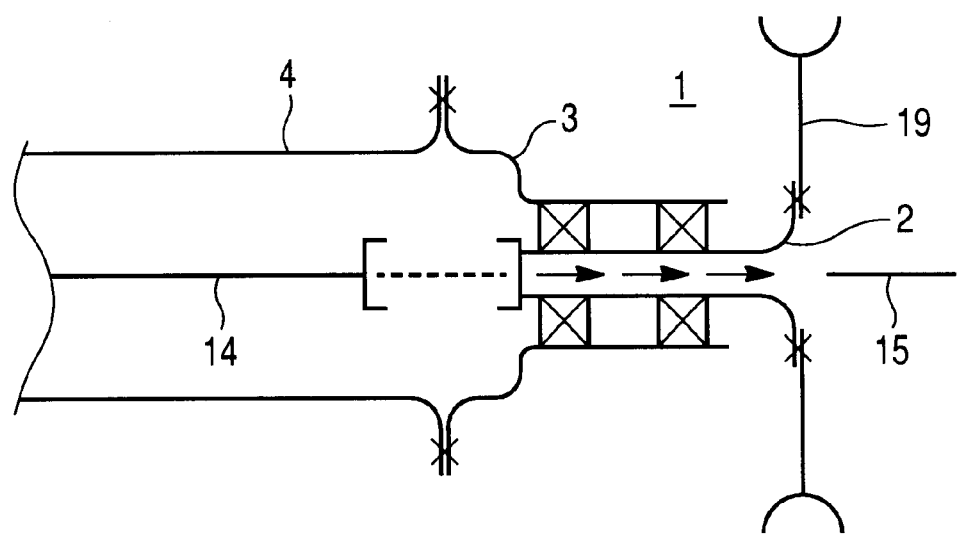

Referring now to FIGS. 2A & 2B, the axle hub assembly of the present invention is schematically represented in a driving state and a free rotating state. FIG. 2A depicts removable axle shaft 15 connected to both the driving member 14 and the inner race 2. The inner race 2 being rigidly connected to a wheel body 19 to form a positive connection between the removable axle 15 and wheel body 19. Thus, in the driving state, the driving member 14 rotatably drives the wheel body 19. The removable axle shaft 15 may be splined to the driving member 14. However, other detachable connections may be employed so long as a positive driving connection is maintained and the removable axle shaft 15 may be detached from the driving member 14 and removed through the inner race 2 of the hub assembly 1.

FIG. 2B schematically depicts the present invention in a free running state. As can be seen in FIG. 2B, the removable shaft 15 is detached from the driving member 14 and removed through the inner race 2 of the hub assembly 1. Because the removable shaft 15 is splined to the inner surface of the inner race 2 of the hub assembly 1 and has an external diameter that practically is slightly smaller than the corresponding internal diameter of the inner race 2, the removable shaft 15 may be simply pulled through the inner race 2 and removed from the entire axle hub assembly. To remove the removable axle shaft 15 from the axle hub assembly, the retainer 20 is simply disconnected from the flange portion 6 of the inner race 2 and pulled from outside the axle hub assembly. However, in an embodiment where the retainer merely has an extension to prevent axial displacement of the removable shaft 15, a special tool may be employed to pull the removable shaft 15 from within the inner race 2. The retainer 20 may be equipped with a fitting to engage a slide hammer or other tool to facilitate removal of the removable axle shaft 15. Such an arrangement allows the wheel body 19 to freely rotate such as desired during vehicle towing operations.

Off course, it is noted that drawing figures only depict the present invention for a single axle hub assembly leading to one driven wheel body. It is to be understood that the axle hub assembly of the present invention is employed on both sides of a differential or other gear assembly for each output shaft leading to a driven wheel body.

While the foregoing invention has been shown and described with reference to a preferred embodiment, it will be understood by those possessing skill in the art that various changes and modifications may be made without departing from the spirit and scope of the invention.

For example, the hub assembly 1 may be formed of a unitized assembly where the inner race 2, outer race 3, and roller elements are integrated to form a sealed, tamper-proof unitized hub assembly. The unitized hub assembly, in a pre-assembled state, is simply bolted or otherwise rigidly connected to the axle housing 4 in a single step. The removable axle shaft 15 may then be simply inserted through the unitized hub assembly to engage the driving member 14.

What is claimed is:

1. An axle hub assembly comprising:
    an axle housing adapted to rotatably contain a driving member therein;
    a hub assembly secured to said axle housing and adapted to rotatably secure a wheel body to said axle housing, said hub assembly including;
        an outer race non-rotatably and rigidly connected to said axle housing;
        an inner race disposed within and rotatably secured to said outer race and adapted to be rigidly connected to said wheel body;
        a removable axle shaft mounted within said axle housing and said inner race of said hub assembly and adapted to be connected to said driving member to positively drive said inner race and said wheel body, said removable axle shaft being externally removable from within said inner race of said hub assembly and said axle housing when said hub assembly is connected to said axle housing.

2. The axle hub assembly according to claim 1, wherein tapered roller bearings are disposed between said inner and outer races of said hub assembly to form said rotatable connection there between.

3. The axle hub assembly according to claim 1, wherein said inner race is formed of a hollow substantially cylindrical member having internal splines at a first end and a flange formed at a second end opposite said first end, said flange being adapted to be rigidly connected to said wheel body, said removable axle shaft having external splines engagable with said internal splines of said inner race and being adapted to pass through said inner race to facilitate external removal of said removable axle shaft from said hub assembly when said hub assembly is connected to said axle housing.

4. The axle hub assembly according to claim 1, wherein a brake torque member is disposed between and rigidly connected to said outer race and said axle housing.

5. The axle hub assembly according to claim 3, wherein said hub assembly further comprises a retainer having a portion disposed adjacent to said removable axle shaft and being secured to said flange of said inner race, said retainer substantially sealing an interior of said axle housing from an external environment.

6. The axle hub assembly according to claim 1, wherein said outer race of said hub assembly is bolted to said axle housing.

7. The axle hub assembly according to claim 3, wherein said hollow substantially cylindrical member and said flange of said inner race are formed of a single piece of metal.

8. The axle hub assembly according to claim 5 wherein said retainer has a plug portion disposed within said hollow substantially cylindrical member of said inner race, said plug portion having an annular seal disposed in an annular recess thereof to form a seal between said plug portion and an inner surface of said hollow substantially cylindrical member.

9. The axle hub assembly according to claim 5, wherein said retainer threadingly engages said removable axle to form a connection there between.

10. The axle hub assembly according to claim 2, wherein said inner race, said outer race, and said bearings are formed as a unitized hub assembly.

11. A full floating inverted axle hub assembly comprising:
an axle housing rotatably containing a driving member therein;
a hub assembly secured to said axle housing and rotatably secured to a wheel body, said hub assembly including;
an outer race non-rotatably and rigidly connected to said axle housing;
an inner race disposed within and rotatably secured to said outer race, said inner race having a flange portion rigidly connected to said wheel body;
a removable axle shaft mounted within said axle housing and said inner race of said hub assembly and detachably connected to said driving member to positively drive said inner race and said wheel body, said removable axle shaft being externally removable from said hub assembly and said axle housing when said hub assembly is secured to said axle housing.

12. The axle hub assembly according to claim 1, wherein rolling bearings are disposed between said inner and outer races of said hub assembly to form said rotatable connection there between.

* * * * *